US011913533B2

(12) United States Patent
Imagawa (10) Patent No.: US 11,913,533 B2
(45) Date of Patent: Feb. 27, 2024

(54) STRAIN WAVE GEARING

(71) Applicant: SKG CO., LTD., Niigata (JP)

(72) Inventor: Yutaka Imagawa, Niigata (JP)

(73) Assignee: SKG CO., LTD., Niigata (JP)

( * ) Notice: Subject to any disclaimer, the term of this patent is extended or adjusted under 35 U.S.C. 154(b) by 94 days.

(21) Appl. No.: 17/514,796

(22) Filed: Oct. 29, 2021

(65) Prior Publication Data

US 2023/0140554 A1    May 4, 2023

(51) Int. Cl.
    *F16H 49/00*  (2006.01)
(52) U.S. Cl.
    CPC ..... *F16H 49/001* (2013.01); *F16H 2049/003* (2013.01)
(58) Field of Classification Search
    CPC .......... F16H 49/001; F16H 2049/003
    See application file for complete search history.

(56) References Cited

U.S. PATENT DOCUMENTS 11,060,597 B2 * 7/2021 Imagawa ................ B25J 9/102

FOREIGN PATENT DOCUMENTS

| JP | 2012-072912 | | 4/2012 |
| JP | 2017-180799 A | | 10/2017 |
| JP | 2021021422 A | * | 2/2021 |
| JP | 2021-092270 | | 6/2021 |
| JP | 2021092270 A | * | 6/2021 |

OTHER PUBLICATIONS

Office Action dated Jul. 25, 2023, issued for the corresponding Japanese patent application No. 2019-222917.

* cited by examiner

*Primary Examiner* — Bobby Rushing, Jr.
(74) *Attorney, Agent, or Firm* — Ohlandt, Greeley and Perle, LLP (57) ABSTRACT

A strain wave gearing includes a flex gear including an adjacent member adjacent to an outer gear in a direction along an axis, an outputter including an opposing portion facing the adjacent member in a radial direction centered on the axis, and a transmitter extending along the radial direction. The transmitter is fixed to one of the opposing portion and the adjacent member, and an insertion portion into which the transmitter is inserted is provided in the other of the opposing portion and the adjacent member. The insertion portion allows relative displacement in the circumferential direction of the flex gear and the outputter. A plurality of transmission pairs is arranged in the circumferential direction, the transmission pairs being pairs of the transmitter and the insertion portion.

20 Claims, 6 Drawing Sheets

STRAIN WAVE GEARING

CROSS-REFERENCE TO RELATED APPLICATION

This application claims the benefit of Japanese Patent Application No. 2019-222917, filed on Dec. 10, 2019, the entire disclosure of which is incorporated by reference herein.

FIELD

The present disclosure relates generally to a strain wave gearing.

BACKGROUND

In the related art, there are reduction drives that use strain wave gearings. For example, Japanese Unexamined Patent Application Publication No. 2012-72912 describes a strain wave gearing that includes a circular spline as an internal gear, a flex spline as an external gear, and a wave generator having an elliptical cam. The flex spline is flexed in an elliptical shape by the cam of the wave generator, and partially engages with the circular spline. Then, when the cam of the wave generator rotates in accordance with a rotation input, the engagement positions between the two gears move in the circumferential direction, thereby producing, between the two gears, relative rotational motion corresponding to the difference in the number of teeth of the two gears. The device according to Japanese Unexamined Patent Application Publication No. 2012-72912 has a structure in which the output shaft is attached to a diaphragm that forms the bottom of the cup-like flex spline.

Herein, a plurality of imaginary points arranged in a circumferential direction centered on a rotational axis (hereinafter referred to as "axis") of the output shaft is considered to be the transmitting points of force from the rotating flex spline to the output shaft. The vector of the force applied to each imaginary point from the rotating flex spline is not uniformly directed in the circumferential direction. That is, shifts occur in the phase depending on the point due to the flexibility of the flex spline, the cam shape of the wave generator, and the like.

With the flex spline according to Japanese Unexamined Patent Application Publication No. 2012-72912, the output shaft is fixed to the diaphragm that closes one end of the cylinder portion. As such, this flex spline has a structure that transmits rotational force to the output shaft around the entire circumference of the cylinder portion. In this structure, a large number of vectors of force in which the flex spline has caused phase shifts such as described above exist. As such, unnecessary stress that does not contribute to the torque for rotating the output shaft is generated in, and unnecessary twisting force is applied to, the cylinder portion of the flex spline. In addition to this unnecessary twisting force being applied, there is a problem in that the flex spline is more likely to break due to the cylinder portion being formed extremely thin (for example, the thickness is about 0.1 mm).

Additionally, with the flex spline according to Japanese Unexamined Patent Application Publication No. 2012-72912, the position of the output shaft is separated from the rotating body on the input side (for example, the cam of the wave generator) by an amount corresponding to the height (length along the axis) of the cylinder portion of the flex spline. Consequently, there is a problem in that the size of the device in the direction along the axis increases.

An objective of the present disclosure is to provide a strain wave gearing that is less likely to break and that can suppress increases in the size of the device.

SUMMARY

A strain wave gearing according to the present disclosure that achieves the objective described above includes:
an internal gear including an inner gear formed along an inner circumferential surface;
a wave generator including a cam that rotates around an axis in accordance with a rotation input;
a flex gear including (i) a ring-shaped outer gear that is formed along an outer peripheral surface with a smaller number of teeth than the inner gear and that has an inner circumferential side fitted to the wave generator and (ii) an adjacent member adjacent to the outer gear in a direction along the axis;
an outputter that includes an opposing portion facing the adjacent member in a radial direction centered on the axis and that rotates together with the flex gear with respect to the internal gear; and
a transmitter that extends along the radial direction and that transmits motive power of the flex gear to the outputter, wherein
the cam has N poles positioned at equal intervals in a circumferential direction centered on the axis, and causes the outer gear to engage with the inner gear at N locations, N being an integer of 2 or greater,
the transmitter is fixed to one of the opposing portion and the adjacent member, and an insertion portion into which the transmitter is inserted is provided in another of the opposing portion and the adjacent member,
the insertion portion has a width along the circumferential direction that is wider than the transmitter, and allows relative displacement in the circumferential direction of the flex gear and the outputter, and
a plurality of transmission pairs is arranged in the circumferential direction, the transmission pairs being pairs of the transmitter and the insertion portion.

According to the present disclosure it is possible to provide a strain wave gearing that is less likely to break and that can suppress increases in the size of the device.

BRIEF DESCRIPTION OF THE DRAWINGS

A more complete understanding of this application can be obtained when the following detailed description is considered in conjunction with the following drawings, in which.

DETAILED DESCRIPTION

Embodiments of the present disclosure are described while referencing the drawings.

Figure 1:
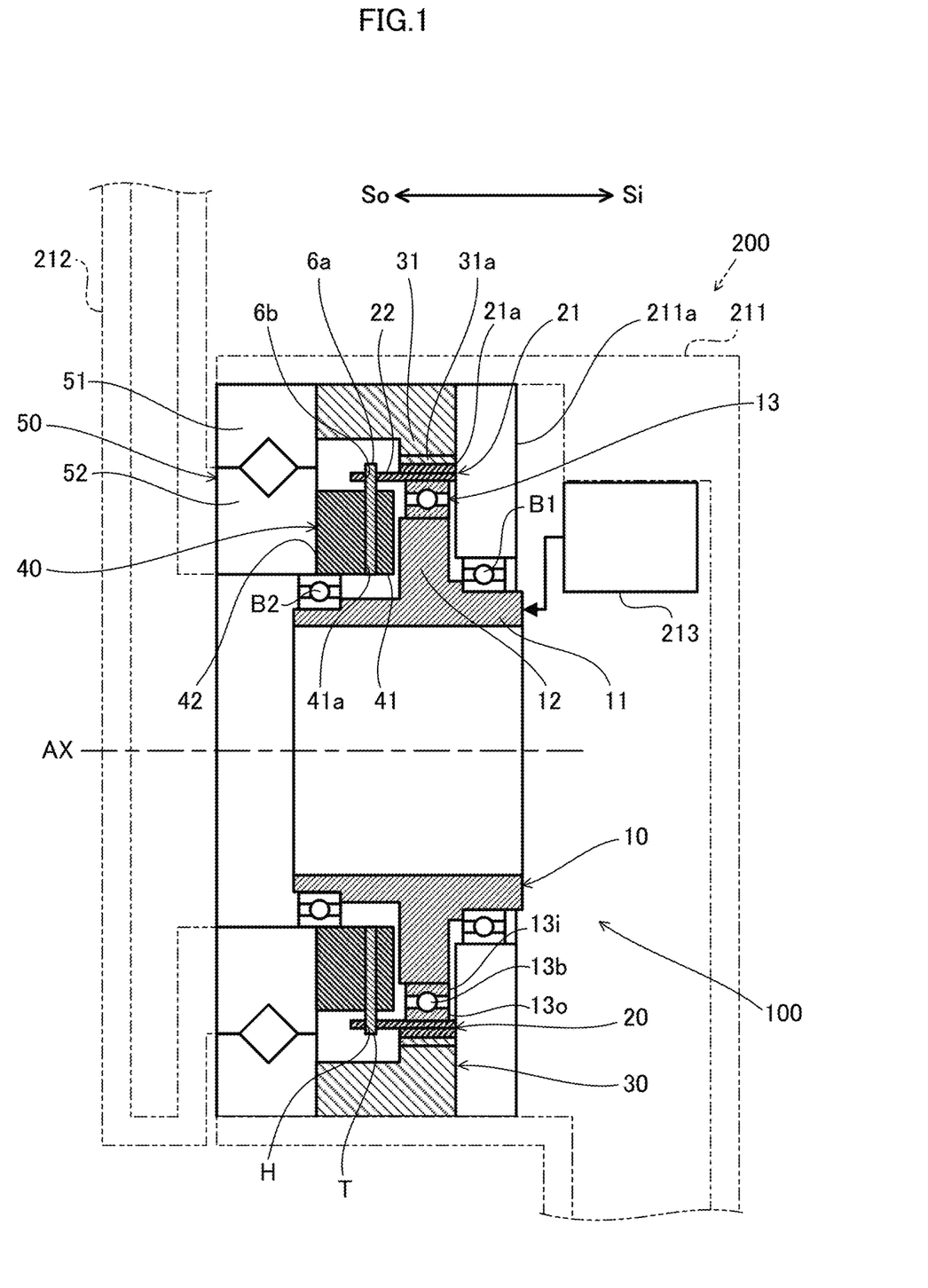
FIG. 1 is a schematic cross-sectional view of the main configuration of a strain wave gearing according to an embodiment of the present disclosure.

As illustrated in FIG. 1, a strain wave gearing 100 is incorporated into an industrial robot 200. In one example, the robot 200 is constituted from a vertical articulated robot. The robot 200 includes a first arm 211, a second arm 212 connected to the first arm 211 via the strain wave gearing 100, a motor 213, and a non-illustrated controller. The motor 213 consists of a servo motor or the like, and operates on the basis of control of the controller. The controller rotates/drives the second arm 212 via the motor 213 installed in the first arm 211 and the strain wave gearing 100 to carry out positioning control, angle control, and rotation speed control of the second arm 212 with respect to the first arm 211.

The strain wave gearing 100 includes a wave generator 10, a flex gear 20, an internal gear 30, an outputter 40, a supporter 50, and a transmitter 6a.

Note that, in FIG. 1, to make the drawing easier to view, a part of the hatching indicating the cross-section of the configuration is omitted. In the following, when explaining the configuration of the strain wave gearing 100, the right side in FIG. 1 is referred to as the input side (indicated as "Si") and the left side is referred to as the output side (indicated as "So"). The same is true for FIG. 9, described later.

The wave generator 10 includes a cylindrical shaft 11, a cam 12 that is formed integrally with the cylindrical shaft 11, and a wave bearing 13.

An input-side end of the cylindrical shaft 11 is rotatably supported by a bearing B1, and an output-side end of the cylindrical shaft 11 is rotatably supported by a bearing B2. The bearing B1 is provided on an immovable part 211a that is immovable with respect to the first arm 211. The bearing B2 is provided on an inner circumferential surface of the outputter 40. In one example, the bearings B1, B2 are implemented as ball bearings. Due to this configuration, the cylindrical shaft 11 is supported rotatably around an axis AX with respect to the first arm 211. The rotational motive power of the motor 213 is transmitted to the cylindrical shaft 11 by a known transmission mechanism. It is sufficient that this transmission mechanism is a gear mechanism, a belt mechanism using a timing belt and a pulley, or the like.

The cam 12 is provided protruding in an outer diameter direction from the outer peripheral surface of the cylindrical shaft 11. The cam 12 is provided at a position adjacent to the bearing B1 in a direction along the axis AX (hereinafter referred to as the "axial direction"). The cam 12 has N poles (where N is an integer of 2 or greater) positioned at equal intervals in a circumferential direction centered on the axis AX. In the following, the number of poles of the cam 12 is referred to as the "number of poles." For example, as illustrated in FIG. 2A a cam 12 for which the number of poles N=2 has an elliptical shape when viewed from the axial direction.

Figure 2A:
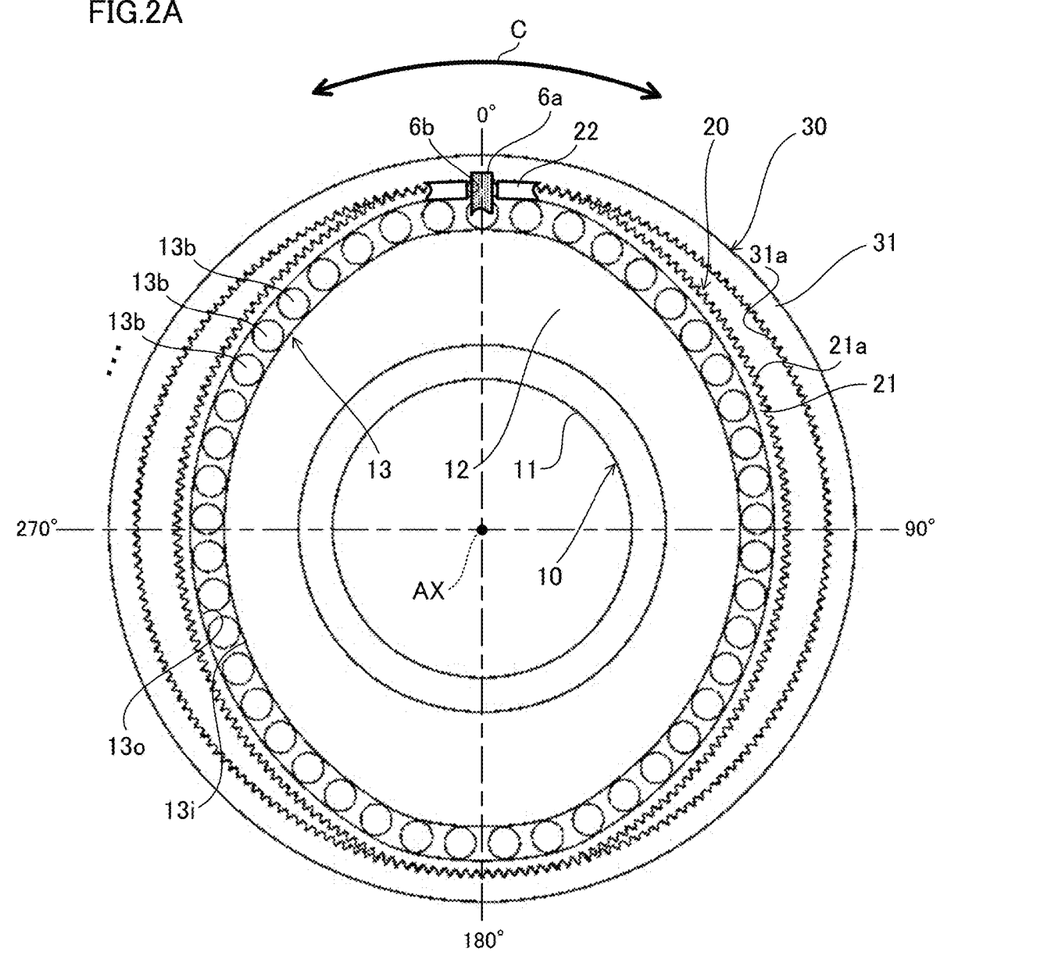
FIG. 2A is a drawing in which the main configuration of the strain wave gearing according to the embodiment is viewed from an axial direction, illustrating a case in which a number of poles of a cam is 2.

As illustrated in FIGS. 1 and 2A, the wave bearing 13 includes an inner ring 13i fixed to the outer peripheral surface of the cam 12, a flexible outer ring 13o, and a plurality of balls 13b inserted in a rollable state between the inner ring 13i and the outer ring 13o. Note that the inner ring 13i may be formed from a portion including the outer peripheral surface of the cam 12.

The flex gear 20 is provided with flexibility due to a metal material such as a special steel or the like and, in one example, is formed in a cylindrical shape along the axial direction. The flex gear 20 includes an outer gear 21, and an adjacent member 22 that is formed integrally with the outer gear 21.

The outer gear 21 includes a plurality of teeth 21a formed along the outer peripheral surface, is formed in a ring shape, and has an inner circumferential side fitted to the outer ring 13o of the wave generator 10. The plurality of teeth 21a of the outer gear 21 are arranged along the circumferential direction at a set pitch. A number of teeth t that is the number of the teeth 21a of the outer gear 21 is less than a number of teeth T that is the number of the teeth 31a of an inner gear 31 (described later). In one example, when the number of poles of the cam 12 is N, the relationship between the number of teeth t and the number of teeth T is set so that T=t+N is established. For example, when N=2, the relationship of T=t+2 is established.

Figure 2B:
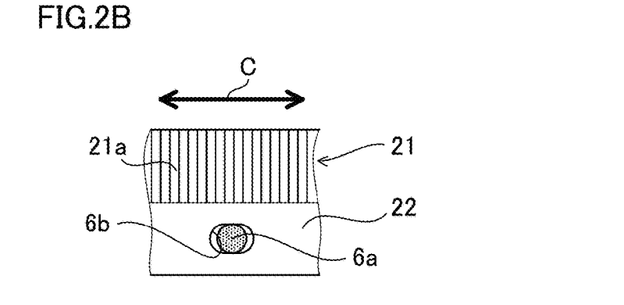
FIG. 2B is a drawing illustrating a portion of an outer peripheral surface of a flex gear.

The adjacent member 22 is adjacent to the outer gear 21 in the axial direction, and pushes out more to the output side than the outer gear 21. As illustrated in FIGS. 2A and 2B, the adjacent member 22 includes an insertion portion 6b into which the transmitter 6a is inserted. The motive power of the flex gear 20 is transmitted to the outputter 40 via the transmitter 6a that is inserted into the insertion portion 6b. A plurality of insertion portions 6b is provided along the circumferential direction centered on the axis AX. The number of insertion portions 6b is the same as the number of transmitters 6a. The transmitter 6a and the insertion portion 6b are described later.

Note that, in FIGS. 2A and 2B, the adjacent member 22 of the flex gear 20 is partially illustrated. FIG. 2B is a drawing of a portion of the outer peripheral surface of the flex gear 20, viewed from the 0° direction illustrated in FIG. 2A.

The adjacent member 22 may have any shape. For example, the entire circumference of the adjacent member 22 may push out more than the outer gear 21 in a ring-like manner, or the adjacent member 22 may push out more to the output side than the outer gear 21 at each portion where the insertion portion 6b is provided.

The internal gear 30 is formed with rigidity due to the metal material, and is fixed to an inner side of the first arm 211. The internal gear 30 includes an inner gear 31 that partially engages with the outer gear 21 of the flex gear 20 flexed by the cam 12. The inner gear 31 includes a plurality of teeth 31a formed along the inner circumferential surface, and is formed in a ring shape. The plurality of teeth 31a of the inner gear 31 is arranged along the circumferential direction at a set pitch.

The outputter 40 rotates together with the flex gear 20 with respect to the internal gear 30. The outputter 40 is supported, by the supporter 50, rotatably around the axis AX with respect to the internal gear 30. In one example, the outputter 40 is formed in a ring shape, with rigidity due to the metal material.

The outputter 40 includes an opposing portion 41 that faces the adjacent member 22 of the flex gear 20 in a radial direction centered on the axis AX (hereinafter referred to simply as the "radial direction"), and a supported portion 42 that is a portion positioned more to the output side that the opposing portion 41 and supported by the supporter 50. A fixing hole 41a for fixing the transmitter 6a to the outputter 40 is formed in the opposing portion 41. As illustrated in FIG. 1, the opposing portion 41 of the outputter 40 is positioned on the inner circumferential side of the adjacent member 22 of the flex gear 20.

In one example, the supporter 50 is constituted from a cross roller bearing, and includes an outer ring 51 fixed to the internal gear 30, and an inner ring 52 fixed to the supported portion 42 of the outputter 40.

In this embodiment, the outputter 40 is connected to the second arm 212 that is the load of the strain wave gearing 100, via the inner ring 52 of the supporter 50. As a result of this configuration, the second arm 212 rotates around the axis AX due to the rotation of the outputter 40. Note that the mode of supporting the outputter 40 by the supporter 50 and the method of connecting the outputter 40 to the load can be changed as desired.

As illustrated in FIG. 1, the adjacent member 22 of the flex gear 20 and the opposing portion 41 of the outputter 40 are positioned between the supporter 50 and the cam 12 in the axial direction. The transmitter 6a fixed to the outputter 40 is pressed, by the flex gear 20, in the circumferential direction centered on the axis AX (hereinafter referred to simply as the "circumferential direction") and, as a result, the outputter 40 rotates together with the flex gear 20.

The transmitter 6a transmits the motive power of the flex gear 20 to the outputter 40, and is fixed to the opposing portion 41 of the outputter 40. In one example, the transmitter 6a is constituted by a cylindrical pin. The transmitter 6a is inserted into the fixing hole 41a of the opposing portion 41, and is fixed by a known method such as screwing, fitting, sticking, welding, or the like. The transmitter 6a extends along the radial direction centered on the axis AX and toward the adjacent member 22 of the flex gear 20, and is inserted into the insertion portion 6b of provided on the adjacent member 22.

Figure 3:
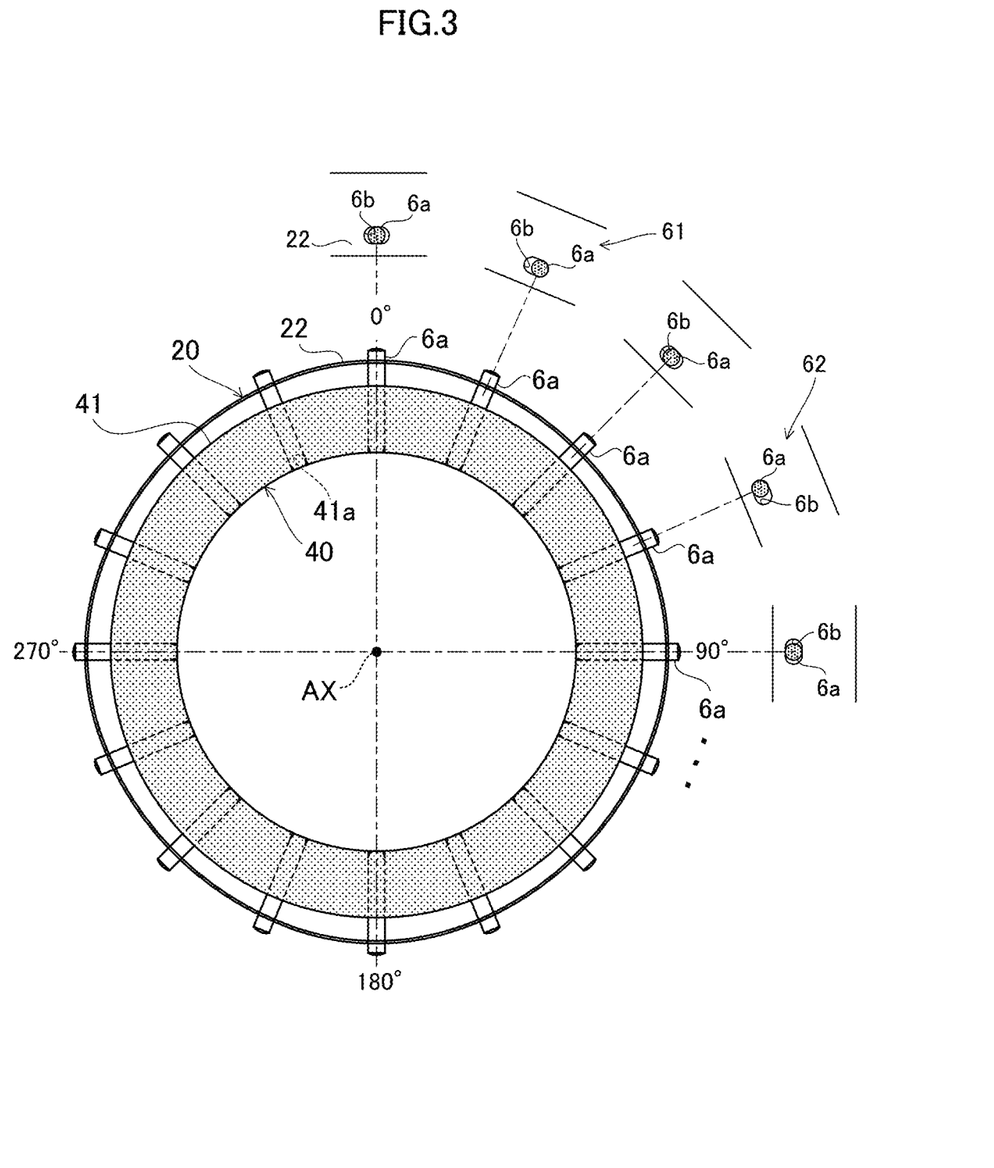
FIG. 3 is drawing for explaining the arrangement and features of a transmitter according to the embodiment.

As illustrated in FIGS. 2A and 2B, the transmitter 6a is inserted in the insertion portion 6b. The insertion portion 6b is an elongated hole having an opening diameter in the circumferential direction (indicated by "C" in the drawings) that is longer than the outer diameter (diameter) of the pin constituting the transmitter 6a. Due to this configuration, the insertion portion 6b allows relative displacement in the circumferential direction of the flex gear 20 and the transmitter 6a (that is, relative displacement in the circumferential direction of the flex gear 20 and the outputter 40). The elongated hole serving as the insertion portion 6b is a through-hole that penetrates the adjacent member 22 in the radial direction centered on the axis AX. Accordingly, the insertion portion 6b also allows relative displacement in the radial direction of the flex gear 20 and the transmitter 6a (that is, relative displacement in the radial direction of the flex gear 20 and the outputter 40). It is sufficient that the length in the circumferential direction of the insertion portion 6b is set such that a first pair 61 and a second pair 62 (described later) can appear as pairs of the transmitter 6a and the insertion portion 6b. Additionally, it is sufficient that the width in the axial direction of the insertion portion 6b is slightly greater than the outer diameter of the pin constituting the transmitter 6a, and is a size that does not obstruct movement in the circumferential direction and the radial direction of the transmitter 6a in the insertion portion 6b. As illustrated in FIG. 3, a plurality of transmission pairs, each of which is a pair of a transmitter 6a and an insertion portion 6b, is provided along the circumferential direction, and is arranged at equal intervals in the circumferential direction.

Deceleration Operations

Next, the deceleration operations of the strain wave gearing 100 are described. Provided that the number of poles N of the cam 12 is 2 or greater, the number of poles N can be set as desired according to an objective. Here, a case is described of a cam 12 in which N=2 and an elliptical shape is formed.

When the motor 213 operates due to control by the controller of the robot 200, the rotational motive power of the motor 213 is transmitted to the cam 12 of the wave generator 10 via the non-illustrated transmission mechanism, and the cam 12 rotates at a comparatively high speed around the axis AX.

Here, to facilitate comprehension, it is assumed that the cam 12 prior to rotation start is, as illustrated in FIG. 2A, at an initial position where the long axis of the elliptical shape of the cam 12 is aligned with an axis that passes through 0° and 180°. The cam 12 that is at the initial position causes the outer gear 21 of the flex gear 20 to engage with the inner gear 31 of the internal gear 30 at two engagement positions, namely 0° and 180°, which correspond to the two poles. Note that the illustrated angles are angles centered on the axis AX. The twelve o'clock direction is 0°, and angles increase in the clockwise direction. It is assumed that the cam 12 rotates in the clockwise direction.

In a case in which θ is the angle that the flex gear 20 rotates in the counter-clockwise direction with respect to the internal gear 30 when the cam 12 rotates an angle α in the clockwise direction from the initial position, θ={360°×(T−t)/T}×α/360°=(α/T)×N is established. When using a cam 12 in which the number of poles N=2, the difference between the numbers of teeth of the inner gear 31 and the outer gear 21 is T−t=N=2 and, as such, θ=(α/T)×2 is established. For example, when this cam 12 rotates 90°, the flex gear 20 rotates in the counter-clockwise direction the angle θ=(90°/T)×2, which corresponds to the amount of ½ tooth, which is ¼ (90°/360°) the difference between the numbers of teeth of 2.

Thus, the flex gear 20 elastically deforms in accordance with the rotation of the cam 12, and the engagement positions with the internal gear 30 sequentially move. Moreover, when the cam 12 rotates 360°, the flex gear 20 rotates in the counter-clockwise direction the angle θ=(360°/T)×2, which corresponds to the amount of the difference between the numbers of teeth of 2. Thus, the outputter 40 that rotates/moves together with the flex gear 20 is decelerated by a reduction ratio i=(T−t)/t with respect to the rotation speed of the cam 12. That is, according to the strain wave gearing 100, it is possible to rotate/control, with high accuracy, the load (in this example, the second arm 212) connected to the outputter 40 with output decelerated by the reduction ratio i described above. Note that any reduction ratio i can be used. For example, the reduction ratio i can be set to about 1/30 to 1/320.

Figure 4A:
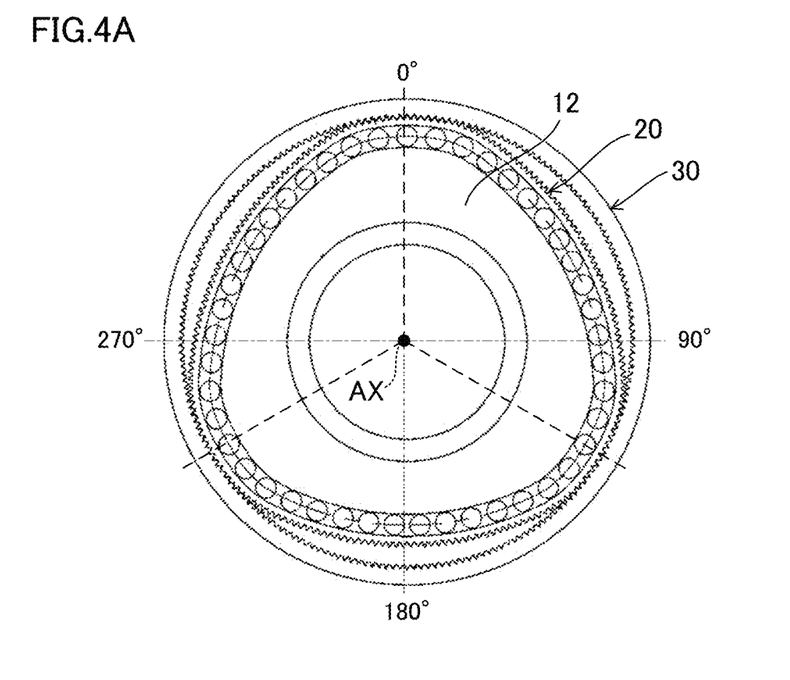
FIG. 4A is a drawing in which a cam for which the number of poles is 3 and the flex gear are viewed from the axial direction.
Figure 4B:
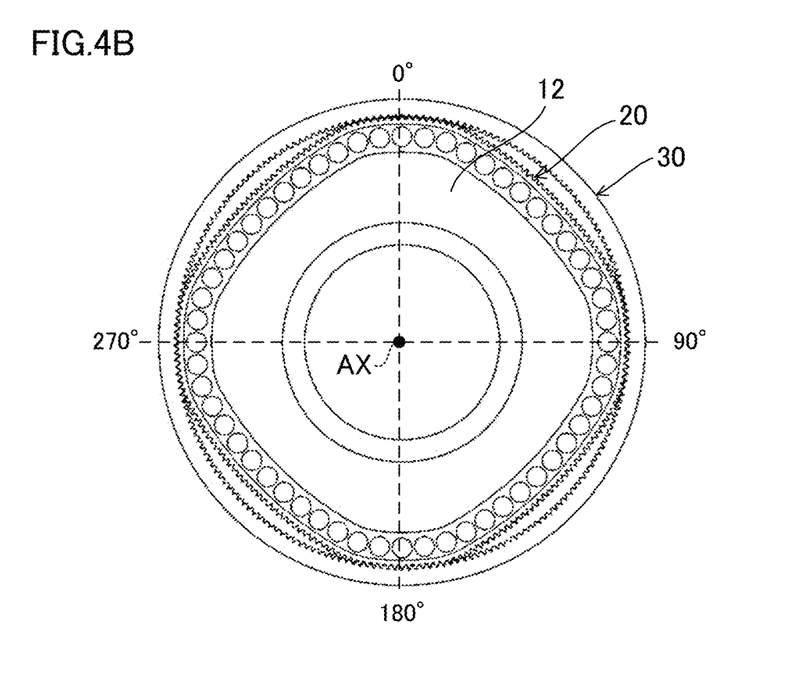
FIG. 4B is a drawing in which a cam for which the number of poles is 4 and the flex gear are viewed from the axial direction.

In the description given above, a case is described in which the number of poles N=2, but the concept is the same for cases in which N≥3 and, as such, such cases are described collectively. When then number of poles N≥3, the shape of the cam 12 when viewed from the axial direction forms a regular N-sided shape and, in one example, each pole and the space between adjacent poles has a curved surface shape that gently expands in the outer peripheral direction. FIG. 4A illustrates a case in which the number of poles N is 3, and FIG. 4B illustrates a case in which the number of poles N is 4. Note that, while not illustrated in the drawings, the same effects can be realized for cases in which N≥5.

The outer gear 21 of the flex gear 20 is flexed by the cam 12 having the N poles via the wave bearing 13, and engages with the inner gear 31 of the internal gear 30 at the N locations. When the number of poles of the cam 12 is N, the relationship between the number of teeth t of the outer gear 21 (hereinafter referred to as the "number of teeth t of the flex gear 20") and the number of teeth T of the inner gear 31 (hereinafter referred to as the "number of teeth T of the internal gear 30") is set such that T=t+N is established.

Moreover, when, for example, the cam 12 rotates 360° in the clockwise direction, the flex gear 20 moves an amount corresponding to N teeth in the counter-clockwise direction. Specifically, when the number of poles of the cam 12 is N, when the cam 12 rotates the angle (360°/N), the flex gear 20 moves an amount corresponding to one tooth with respect to the internal gear 30. When the number of poles of the cam 12 is N, the outputter 40 fixed to the flex gear 20 is decelerated by the reduction ratio i=(T−t)/t=N/t with respect to the rotation speed of the cam 12.

As described above, with the strain wave gearing 100, when the number of poles N of the cam 12 is set to 2, and even when N≥3, when the cam 12 of the wave generator 10 rotates in accordance with rotation input from the motor 213, the engagement positions of the gears of the flex gear 20 and the internal gear 30 move in the circumferential direction, and the flex gear 20 rotates in the opposite direction of the cam 12 with respect to the internal gear 30, in accordance with the difference between the numbers of teeth of the two gears.

Transmitter 6a and insertion portion 6b

Next, the transmitter 6a and the insertion portion 6b are described. FIG. 3 illustrates a preferred arrangement example of the transmitter 6a and the insertion portion 6b in which the number of poles N of the cam 12 is 4 (that is, the shape illustrated in FIG. 4B).

Note that, in FIG. 3, the portion of drawing located outward from the illustration of the flex gear 20 and the outputter 40 viewed from the axial direction illustrates the relative displacement of the transmitter 6a and the insertion portion 6b in the illustrated 0° to 90° range, in a case in which a cam 12 in which the number of poles N is 4 is rotating around the axis AX in accordance with the operations of the motor 213 (hereinafter referred to as "relative displacement drawing").

Viewing the relative displacement drawing of FIG. 3, it is understood that the position of the transmitter 6a with respect to the insertion portion 6b is not uniform at each position where the transmitter 6a is provided. This is caused by the phase shifting described above in the summary. The strain wave gearing 100 according to the present embodiment uses the hereinafter described effects of the transmitter 6a and the insertion portion 6b to reduce the unnecessary stress that is caused by the phase shift and that does not contribute to the rotation of the outputter 40, and rotates outputter 40 with excellent transmission efficiency.

In the example illustrated in FIG. 3, 16 transmitters 6a arranged at equal intervals in the circumferential direction are fixed to the opposing portion 41 of the outputter 40. Additionally, 16 of the insertion portions 6b are provided on the adjacent member 22 of the flex gear 20. Each of 16 of the transmitters 6a is inserted into each of the insertion portions 6b. Specifically, the transmission pairs that are pairs of a transmitter 6a and an insertion portion 6b are arranged in the circumferential direction every 360°/16 (=22.5°).

As illustrated in the relative displacement drawing of FIG. 3, in the transmission pair positioned in the 0° direction, in a state in which the transmitter 6a is positioned in the center in the circumferential direction of the insertion portion 6b, the transmitter 6a positioned in the 45° direction and the transmitter 6a positioned in the 90° direction are positioned in the center in the circumferential direction of the insertion portion 6b corresponding to each transmitter 6a. The transmitters 6a positioned in the 0°, 45°, and 90° directions do not contact the insertion portion 6b corresponding to each transmitter 6a in the circumferential direction and, as such do not contribute to the rotation of the outputter 40.

In the following, transmission pairs in which the transmitter 6a is positioned at the center of the insertion portion 6b in the circumferential direction, such as the transmission pairs positioned in the 0°, 45°, and 90° directions of FIG. 3, are referred to as "first state transmission pairs." That is, the first state transmission pairs do not contribute to the rotation of the outputter 40.

Meanwhile, in a state in which the first state transmission pairs are positioned in the 0°, 45°, and 90° directions, the transmitter 6a positioned in the 22.5° direction is positioned at one end (the end in the clockwise direction in the drawing) of the insertion portion 6b in which that transmitter 6a is inserted. Additionally, the transmitter 6a positioned in the 67.5° direction is positioned at the other end (the end in the counter-clockwise direction in the drawing) of the insertion portion 6b in which that transmitter 6a is inserted. The transmitter 6a positioned in the 22.5° direction contacts, in the circumferential direction, the insertion portion 6b of the flex gear 20 that moves in the counter-clockwise direction when the cam 12 is rotating in the clockwise direction and, as such, contributes to the rotation of the outputter 40. The transmitter 6a positioned in the 67.5° direction contacts, in the circumferential direction, the insertion portion 6b of the flex gear 20 that moves in the clockwise direction when the cam 12 is rotating in the counter-clockwise direction and, as such, contributes to the rotation of the outputter 40.

In the following, transmission pairs in which the transmitter 6a contacts the insertion portion 6b in the circumferential direction, such as the transmission pairs positioned in the 22.5° and 67.5° directions of FIG. 3, are referred to as "second state transmission pairs." That is, the second state transmission pairs contribute to the rotation of the outputter 40.

Note that the behavior of the transmitters 6a and the insertion portions 6b in each of the 90° to 180°, 180° to 270°, and 270° to 360° ranges is the same as the transmitters 6a and the insertion portions 6b in the 0° to 90° range. That is, the first state transmission pairs and the second state transmission pairs alternately appear every position where the center angle with respect to the axis AX is 22.5°. Additionally, although the relative displacement drawing of FIG. 3 is illustrated in a static manner, the first state transmission pairs transition to second state transmission pairs via an intermediate state in accordance with the rotation of the flex gear 20. Conversely, the second state transmission pairs transition to first state transmission pairs via the intermediate state. Specifically, in a process in which the outputter 40 rotates 22.5°, the transmitters 6a that are not contributing to the rotation of the outputter 40 are displaced with respect to the insertion portions 6b, thereby contacting the flex gear 20 in the circumferential direction and becoming transmitters 6a that contribute to the rotation of the outputter 40. Conversely, the transmitters 6a that contact the flex gear 20 in the circumferential direction and are contributing to the rotation of the outputter 40 are displaced with respect to the insertion portions 6b, thereby becoming transmitters 6a that do not contribute to the rotation of the outputter 40.

Next, an overview of the transmission pairs illustrated in FIG. 3 is given.

When the number of poles N of the cam 12 is 4, when the cam 12 rotates the angle (360°/4), the flex gear 20 moves an amount corresponding to one tooth with respect to the internal gear 30. Thus, in the 90° range that is the rotation angle of the cam 12 for moving the flex gear 20 an amount corresponding to one tooth with respect to the internal gear 30, the first state transmission pairs and the second state transmission pairs alternately appear every 90°/4=22.5°. The transmission pairs in the 90° range include a first pair 61 in which the transmitter 6a is positioned at one end in the circumferential direction of the insertion portion 6b, and a second pair 62 in which the transmitter 6a is positioned at the other end in the circumferential direction of the insertion portion 6b.

In the relative displacement drawing of FIG. 3, the first pair 61 is positioned in the 22.5° direction, and the second pair 62 is positioned in the 67.5° direction. Extending this to the 360° range, the 16 transmission pairs include four of the first pairs 61 arranged at equal intervals in the circumferential direction and four of the second pairs 62 arranged at equal intervals in the circumferential direction. The first pairs 61 and the second pairs 62 alternately exist every 45° in the 360° range.

The concept described above is not limited to cases in which N=4, and can be generalized. Accordingly, a case in which the number of poles of the cam 12 is N (an integer of 2 or greater) and there are (4×N) transmission pairs is described. The transmission pairs are arranged at equal intervals in the circumferential direction.

When the cam 12 in which the number of poles is N rotates the angle (360°/N), the flex gear 20 moves an amount corresponding to one tooth with respect to the internal gear 30. Thus, in the (360°/N) range that is the rotation angle of the cam 12 for moving the flex gear 20 an amount corresponding to one tooth with respect to the internal gear 30, the first state transmission pairs and the second state transmission pairs alternately appear every 360°/(4×N). The transmission pairs in the (360°/N) range include the first pair 61 and the second pair 62. Extending this to the 360° range, the (4×N) transmission pairs include N of the first pairs arranged at equal intervals in the circumferential direction and N of the second pairs arranged at equal intervals in the circumferential direction. Furthermore, the first pairs 61 and the second pairs 62 alternately exist every 360° (2×N).

Note that, when the number of poles of the cam 12 is N, (4×N) or more transmission pairs may be provided. In such a case, the plurality of transmission pairs includes first state transmission pairs, second state transmission pairs, and intermediate state transmission pairs that are transitioning from one of the first state and the second state to the other of the first state and the second state. The transmitters Ga of the intermediate state transmission pairs do not contact the insertion portions 6b in the circumferential direction and, as such, the intermediate state transmission pairs do not contribute to the rotation of the outputter 40. However, as with the first state transmission pairs, the intermediate state transmission pairs transition, in accordance with the rotation of the flex gear 20, to second state transmission pairs that contribute to the rotation of the outputter 40.

As described above, the first state transmission pairs and the second state transmission pairs appear alternately and, as such, the relative displacement of the transmitter 6a and the insertion portion 6b in the circumferential direction can be absorbed by the so-called cam method. Therefore, according to the strain wave gearing 100, the occurrence of unnecessary stress, that does not contribute to the torque for rotating the outputter 40, in each of the flex gear 20 and the outputter 40 can be reduced and the application of unnecessary twisting force to the flex gear 20 can be reduced.

When the flex gear 20 flexed by the cam 12 rotates/moves with respect to the internal gear 30, the two gears of the flex gear 20 and the internal gear 30 engage and move. As such, pulsation in the radial direction is generated. The insertion portion 6b according to the present embodiment also allows relative displacement of the flex gear 20 and the transmitter 6a in the radial direction. As such, relative displacement of the transmitter 6a and the insertion portion 6b in the radial direction can also be absorbed. This also leads to a reduction in the unnecessary stress described above.

The second state transmission pairs include the first pair 61 and the second pair 62 that are arranged at equal intervals in the circumferential direction. Due to this, force in the circumferential direction can be efficiently transmitted from the flex gear 20 to the outputter 40.

As a result, according to the strain wave gearing 100 of the present embodiment, the mechanical loss caused when the flex gear 20 is completely fixed to the outputter 40 can be significantly reduced, and excellent transmission efficiency can be realized. Additionally, breaking of the flex gear 20 can be suppressed.

Since the output points (that is, the positions where the transmitter 6a is provided) at which the force from the flex gear 20 is transmitted to the outputter 40 are uniformly distributed in the circumferential direction, the load per engagement location between the flex gear 20 and the internal gear 30 is reduced and, as a result, the outputter 40 can be rotated with high torque.

Note that the number of transmission pairs is not limited to (4×N). The number of transmission pairs can be changed as desired depending on the number of N.

For example, in a case in which the number of poles N of the cam 12 is 8, when there are (4×N)=32 transmission pairs, in the (360°/N)=45° range that is the rotation angle of the cam 12 for moving the flex gear 20 an amount corresponding to one tooth with respect to the internal gear 30, the first state transmission pairs and the second state transmission pairs alternately appear every {360°/(4×N)}=11.25°. Extending this to the 360° range, the 32 transmission pairs include eight of the first pairs 61 arranged at equal intervals in the circumferential direction and eight of the second pairs 62 arranged at equal intervals in the circumferential direction.

However, providing four of each of the first pair and the second pair is thought to be sufficient to stably rotate the outputter 40 and, as such, (2×N)=16 transmission pairs may be provided. In addition to cases where N=8, it is thought it is possible to configure so that all of the transmitters 6a contribute to the rotation of the outputter 40 by setting the transmission pairs to (2×N) and providing N each of the first pairs 61 and the second pairs 62. Furthermore, the number of transmission pairs may be set regardless of the number of N. For example, provided that 16 transmission pairs are arranged at equal intervals in the circumferential direction and at least four or more of each of the first pairs 61 and the second pairs 62 are provided, the outputter 40 can be stably rotated, regardless of the number of N. Thus, the outputter 40 to which the transmitter 6a is fixed can be shared regardless of the number of poles N of the cam 12 and, as such, manufacturing efficiency can be improved.

As described above, even in the case of a strain wave gearing 100 in which the number of transmission pairs is set to (2×N) or is set to a fixed value (for example, 16) independent of the number of N, the unnecessary stress can be reduced and excellent transmission efficiency can be realized due to the same effects as described above.

Note that, in the first pairs 61, it is sufficient that "the transmitter 6a is positioned on one end in the circumferential direction of the insertion portion 6b" is a mode in which the transmitter 6a contacts or is proximal to the one end in the circumferential direction of the insertion portion 6b.

Likewise, in the second pairs 62, it is sufficient that "the transmitter 6a is positioned on the other end in the circumferential direction of the insertion portion 6b" is a mode in which the transmitter 6a contacts or is proximal to the other end in the circumferential direction of the insertion portion 6b. That is, in a case in which the flex gear 20 moves toward the transmitter 6a, it is sufficient that first pairs 61 and the second pairs 62 are in a mode in which the transmitter 6a can immediately be pushed in the circumferential direction by the insertion portion 6b.

It is sufficient that the plurality of transmission pairs "is arranged at equal intervals in the circumferential direction" is a state in which the plurality of transmitters 6a arranged at equal intervals in the circumferential direction is inserted into the plurality of insertion portions 6b corresponding to the plurality of transmitters 6a. For example, the "transmission pairs positioned in each of the 0°, 45°, and 90° directions" refers to transmission pairs in which the transmitters 6a are positioned in each of the 0°, 45°, and 90° directions. This relationship is true for other angles as well. Note that, since the insertion portion 6b is provided in the flex gear 20 that has flexibility, depending on the state of the transmission pairs, a shift in a range of −2 degrees to +2 degrees with respect to the corresponding transmitter 6a occurs.

Provided that the first pairs 61 and the second pairs 62 can be created, the plurality of transmission pairs need not be arranged at equal intervals in the circumferential direction. In such a case, from the perspective of stably rotating the outputter 40, it is preferable that the overall center of gravity of the outputter 40 and the plurality of transmitters 6a fixed to the outputter 40 match the axis AX, and that the moment of inertia around the axis AX is minimized.

In the strain wave gearing 100, the adjacent member 22 of the flex gear 20 and the opposing portion 41 of the outputter 40 are positioned between the supporter 50 and the cam 12. Due to this, the distance in the axial direction from the rotation input element to the output element can be shortened. As a result, each component can be made compact in the axial direction, and a size of the strain wave gearing 100 can be reduced. Additionally, when the distance in the axial direction from the rotation input element to the output element is short, stress in a diagonal direction with respect to the axis AX is less likely to be applied to the flex gear 20 and the internal gear 30 that engage with each other. As a result, tooth crests of one of the flex gear 20 and the internal gear 30 and tooth bottoms of the other of the flex gear 20 and the internal gear 30 can be made to contact along the axial direction, and friction between the gears can be suppressed.

In the strain wave gearing 100, in addition to the cam 12, the flex gear 20 and the outputter 40 are also hollow shapes that form a ring shape when viewed from the axial direction. As such, it is possible to secure space inside the device for routing wiring or the like. Additionally, since the output side end of the flex gear 20 is not closed, the flexibility of the flex gear 20 can be maintained while securing a certain degree of thickness of the flex gear 20. Accordingly, resistance to buckling of the flex gear 20 can be made excellent and the flex gear 20 is less likely to break. Note that the thickness of the flex gear 20 is not limited but, for example, can be set to about 0.5 mm to 1 mm. Additionally, the flex gear 20 has a bottomless cylinder shape and, as such, is easy to machine. Note that, according to the strain wave gearing 100, it goes without saying that backlash can, in principle, be eliminated and lost motion can be minimized.

According to the strain wave gearing 100, in addition to cases in which the number of poles N of the cam 12 is 2, variations in which N≥3 can be provided. As such, the following benefits are obtained. Firstly, a case is considered in which an elliptical shape (N=2) is set for the cam 12 of the wave generator 10. When D is the pitch circle diameter of the internal gear 30, and d is the pitch circle diameter of the flex gear 20, it can be considered that the reduction ratio i is i=(T−t)/t=2/t or i=(D−d)/d. As such, to reduce the value of the reduction ratio i (to obtain decelerated rotation output), it is necessary to increase the number of teeth t or increase the ratio of the diameter d of the flex gear 20 to the diameter D of the internal gear 30. Meanwhile, to increase the value of the reduction ratio i (to suppress the degree of deceleration of the rotation output), it is necessary to decrease the number of teeth t or decrease the ratio of the diameter d of the flex gear 20 to the diameter D of the internal gear 30. Thus, relying solely on an elliptical cam 12 gives rise to various constraints on the size and conditions of the device, and makes it difficult to realize all reduction ratios.

However, in a variation in which the number of poles of the cam 12 is N≥3, even if at least one of the number of teeth T of the internal gear 30 and the number of teeth t of the flex gear 20 is maintained constantly, as understood from reduction ratio i=N/t, the value of the reduction ratio can be increased by increasing the number of poles, and the value of the reduction ratio can be decreased by decreasing the number of poles. In addition to variations of the number of poles, it is possible to realize a substantially innumerable number of variations of the reduction ratio by changing the settings of the number of teeth T or the number of teeth t, and changing the diameter of the flex gear 20 or the internal gear 30.

Note that the present disclosure is not limited by the embodiment and drawings described above, and modifications (including the omission of constituents) and the like can be made, as appropriate, without departing from the scope of the present disclosure. In the following, modified examples in which a part of the configuration of the strain wave gearing 100 is modified are described.

Modified Example 1

Figure 5:
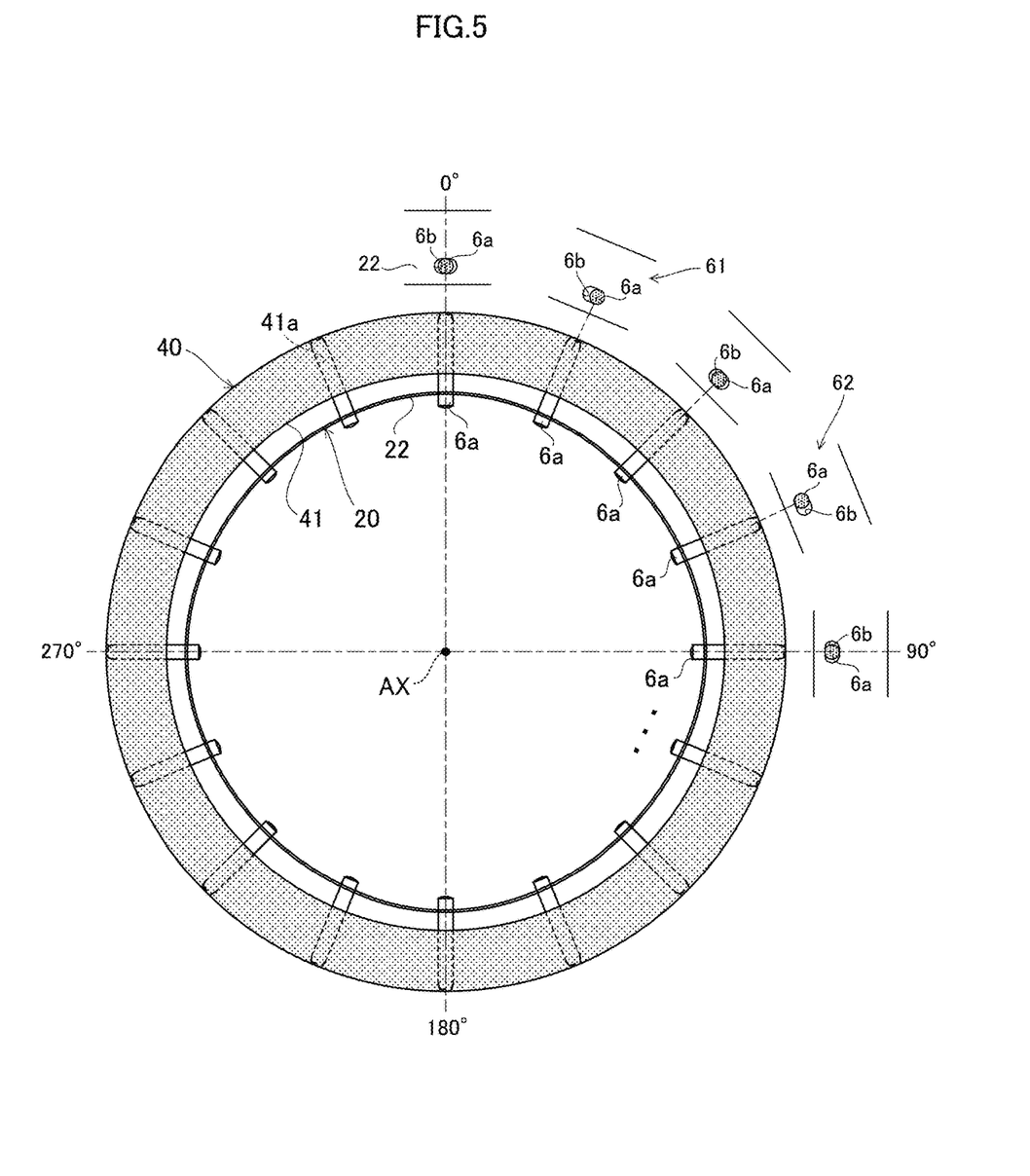
FIG. 5 is a drawing illustrating Modified Example 1, in which the part of the configuration of the strain wave gearing according to the embodiment is modified.

As in Modified Example 1 illustrated in FIG. 5, a configuration is possible in which the outputter 40 is positioned on the outer peripheral side of the flex gear 20. In such a case, the opposing portion 41 of the outputter 40 is positioned on the outer peripheral side of the adjacent member 22 of the flex gear 20. Additionally, the transmitter 6a fixed to the opposing portion 41 extends toward the axis AX and is inserted in the insertion portion 6b provided in the adjacent member 22. Note that, in FIG. 5, the portion of the drawing located outward from the illustration of the flex gear 20 and the outputter 40 viewed from the axial direction illustrates the relative displacement of the transmitter 6a and the insertion portion 6b in the illustrated 0° to 90° range, in a case in which a cam 12 in which the number of poles N is 4 is rotating around the axis AX in accordance with the operations of the motor 213. In Modified Example 1 as well, the number and functions of the transmission pairs that are pairs of the transmitter 6a and the insertion portion 6b are considered to be the same as in the embodiment described above.

Modified Examples 2 and 3

Figure 6A:
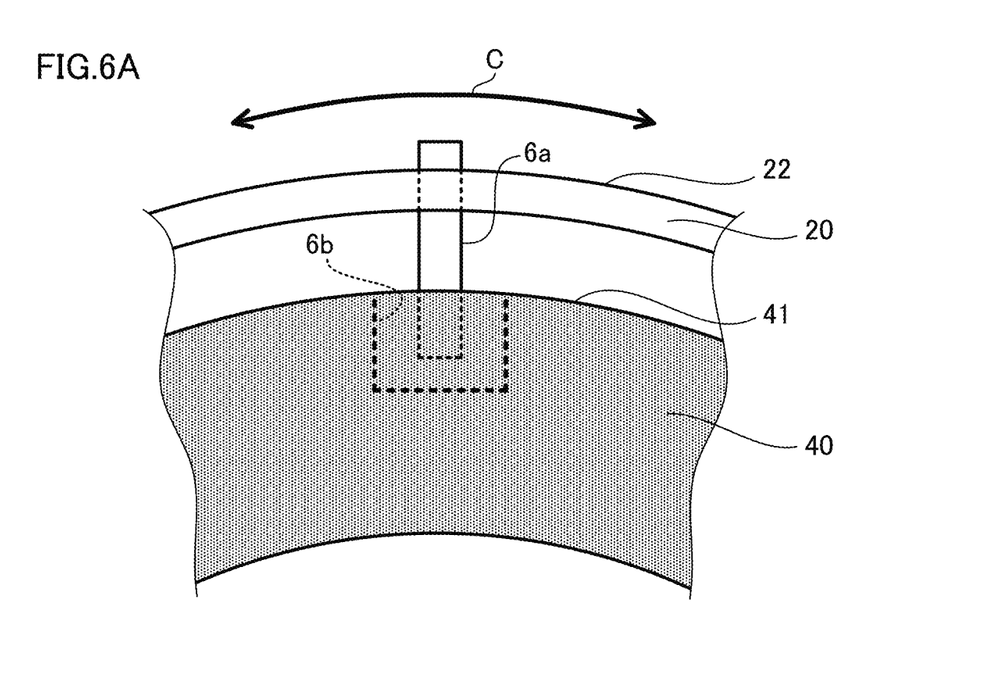
FIG. 6A is a drawing illustrating Modified Example 2, in which the part of the configuration of the strain wave gearing according to the embodiment is modified.
Figure 6B:
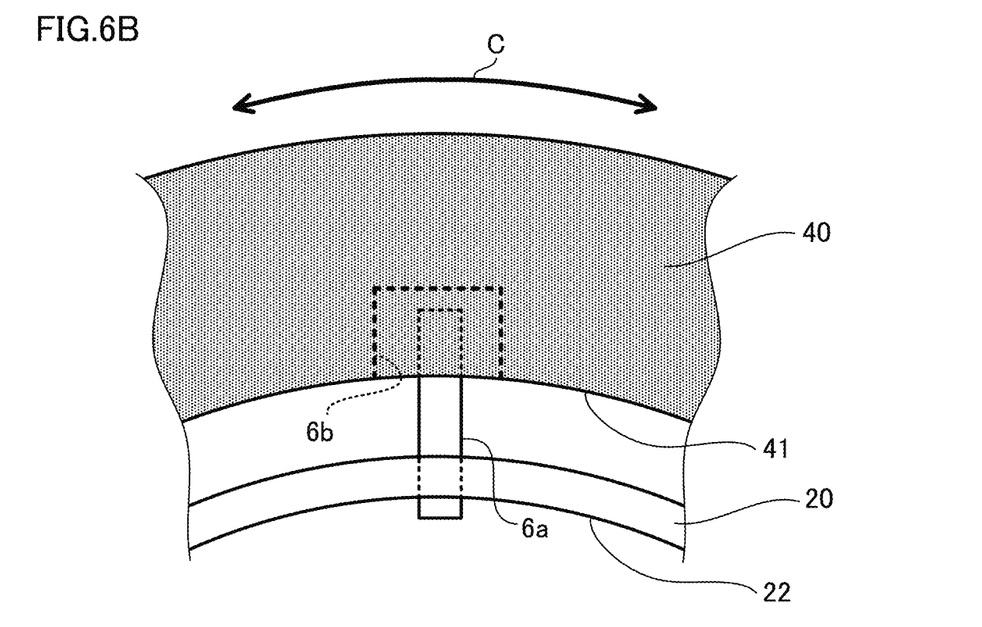
FIG. 6B is a drawing illustrating Modified Example 3, in which the part of the configuration of the strain wave gearing according to the embodiment is modified.

As illustrated in FIGS. 6A and 6B, a configuration is possible in which the transmitter 6a is fixed to the flex gear 20, and the insertion portion 6b is provided in the outputter 40. In such a case, a configuration is possible in which the outputter 40 is positioned on the inner circumferential side of the flex gear 20 as in Modified Example 2 illustrated in FIG. 6A and, a configuration is possible in which the outputter 40 is positioned on the outer peripheral side of the flex gear 20 as in Modified Example 3 illustrated in FIG. 6B.

The transmitter 6a according to Modified Examples 2 and 3 is fixed to the adjacent member 22 of the flex gear 20. This transmitter 6a extends along the radial direction centered on the axis AX and toward the opposing portion 41 of the outputter 40, and is inserted into the insertion portion 6b provided in the opposing portion 41.

The insertion portion 6b according to Modified Examples 2 and 3 is constituted by an elongated hole into which the transmitter 6a is inserted and that has an opening diameter that is longer than the outer diameter (diameter) of the pin constituting the transmitter 6a. Due to this configuration, the insertion portion 6b allows relative displacement in the circumferential direction of the outputter 40 and the transmitter 6a (that is, relative displacement in the circumferential direction of the outputter 40 and the flex gear 20). Additionally, provided that the insertion portion 6b can allow relative displacement in the radial direction of the outputter 40 and the transmitter 6a (that is, relative displacement in the radial direction of the outputter 40 and the flex gear 20), a configuration is possible in which the insertion portion 6b is the bottomed hole illustrated in FIGS. 6A and 6B, and a configuration is possible in which the insertion portion 6b is a non-illustrated through-hole. In Modified Examples 2 and 3 as well, the number and functions of the transmission pairs are considered to be the same as in the embodiment described above. In Modified Examples 2 and 3, it is sufficient that the plurality of transmission pairs "is arranged at equal intervals in the circumferential direction" is, for example, a state in which the corresponding plurality of transmitters 6a is inserted into the plurality of insertion portions 6b arranged at equal intervals in the circumferential direction.

Other Modified Examples

In the foregoing, an example is described in which the strain wave gearing 100 is incorporated into the robot 200 constituted by a vertical articulated robot. However, the present disclosure is not limited thereto. The strain wave gearing 100 can be incorporated into a variety of robots such as a horizontal articulated robot, a delta-type robot, and the like. Additionally, the device that the strain wave gearing 100 is incorporated into is not limited to a robot, and the strain wave gearing 100 may be incorporated into any device that has an objective of obtaining rotation output decelerated by a desired reduction ratio with respect to the rotation input. For example, in addition to a robot, the strain wave gearing 100 may be incorporated into precision machines, hobby supplies, home electronics, vehicle-mounted components, and the like.

Provided that T>t, any values may be used for the number of teeth t of the flex gear 20 and the number of teeth T of the internal gear 30. However, when the number of poles of the cam 12 is N, it is preferable that the relationship between the number of teeth t and the number of teeth T is set to T=t+N.

In the foregoing, an example is described in which one transmitter 6a is constituted from one pin, but a configuration is possible in which one transmitter 6a is constituted from a plurality of pins arranged in the axial direction. In such a case, it is sufficient that the insertion portion 6b corresponding to the transmitter 6a is provided with a size that enables the insertion of the plurality of pins constituting the transmitter 6a. It is sufficient that the insertion portion 6b can allow relative displacement of the flex gear 20 and the outputter 40 in the circumferential direction and the radial direction.

Any materials may be used for the materials of the members of the strain wave gearing 100, and are not limited to metal. For example, the materials of the members of the strain wave gearing 100 can be appropriately selected from engineering plastics, resins, ceramics, and the like in accordance with the purpose of the strain wave gearing 100.

The strain wave gearing 100 described above includes, as the configuration that transmits the motive power of the flex gear 20 to the outputter 40, transmission pairs that are pairs of the transmitter 6a and the insertion portion 6b. The transmitter 6a is fixed to one of the opposing portion 41 and the adjacent member 22, and the insertion portion 6b into which the transmitter 6a is inserted is provided in the other of the opposing portion 41 and the adjacent member 22. Moreover, the width in the circumferential direction of the insertion portion 6b is greater than that of the transmitter 6a, and the insertion portion 6b allows relative displacement in the circumferential direction of the flex gear 20 and the outputter 40. According to this configuration, as described above, it is possible to suppress unnecessary stress from being applied to mainly the flex gear 20 and, as such, the strain wave gearing 100 is less likely to break.

In the strain wave gearing 100, the adjacent member 22 that is adjacent to the outer gear 21 is the component that transmits force from the flex gear 20 to the outputter 40. Due to this, it is possible to suppress increases in the size in mainly the axial direction of the strain wave gearing 100. Additionally, various reduction ratios can be realized with simple configurations by setting the number of poles N to a desired value.

A configuration is possible in which the plurality of transmission pairs is arranged at equal intervals in the circumferential direction. According to such a configuration, since the output points that transmit the force from the flex gear 20 to the outputter 40 are uniformly distributed in the circumferential direction, the outputter 40 can be rotated with high torque.

The plurality of transmission pairs includes transmission pairs that satisfy the conditions of the first pair 61 and the second pair 62 when the cam 12 is rotating around the axis AX. Due to this configuration, as described above, the force in the circumferential direction can be efficiently transmitted from the flex gear 20 to the outputter 40.

It is preferable that there are 2×N of the transmission pairs. Additionally, it is preferable that there are N of the first pairs 61 and N of the second pairs 62. Moreover, it is preferable that the first pairs 61 and the second pairs 62 alternately exist every 360°/(2×N) at angles centered on the axis AX. Note that a configuration is possible in which there are 4×N of the transmission pairs, and a configuration is possible in which there is a fixed number (for example, 16) of the transmission pairs regardless of the number of poles N.

The insertion portion 6b allows relative displacement of the flex gear 20 and the outputter 40 in the radial direction. According to this configuration, relative displacement of the flex gear 20 and the outputter 40 in the radial direction can also be absorbed and, as such, the unnecessary stress described above can be reduced even more.

In the strain wave gearing 100, the adjacent member 22 and the opposing portion 41 are positioned between the supporter 50 and the cam 12. According to this configuration, as described above, the length in the axial direction from the cam 12 to the output point of the flex gear 20 can be reduced, each component can be made compact in the axial direction, and a smaller configuration of the strain wave gearing 100 can be achieved. When the length to the output point can be suppressed in this manner, the tooth crests of one of the flex gear 20 and the internal gear 30 and the tooth bottoms of the other of the flex gear 20 and the internal gear 30 can be made to contact along the axial direction, and friction between the gears can also be suppressed. Note that the supporter 50 is not limited to a cross roller bearing, and may be a ball bearing, a bearing that slidably/rotatably supports the outputter 40, or the like.

It is preferable that the transmitter 6a is constituted by a column-shaped pin, and the insertion portion 6b is constituted by an elongated hole that has an opening diameter in the circumferential direction that is longer than the outer diameter of the pin.

As illustrated in FIGS. 1, 3, and 6A, with a configuration in which the opposing portion 41 is positioned on the inner circumferential side of the adjacent member 22, it is possible to suppress increases in the size of the strain wave gearing 100 in the radial direction.

As illustrated in FIGS. 5 and 6B, with a configuration in which the opposing portion 41 is positioned on the outer peripheral side of the adjacent member 22, space inside the strain wave gearing 100 for routing wiring and the like can be secured, near the axis AX of the strain wave gearing 100.

In the foregoing, descriptions of known technical matters are omitted facilitate comprehension of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A strain wave gearing, comprising:
    an internal gear including an inner gear formed along an inner circumferential surface;
    a wave generator including a cam that rotates around an axis in accordance with a rotation input;
    a flex gear including (i) a ring-shaped outer gear that is formed along an outer peripheral surface with a smaller number of teeth than the inner gear and that has an inner circumferential side fitted to the wave generator and (ii) an adjacent member adjacent to the outer gear in a direction along the axis;
    an outputter that includes an opposing portion facing the adjacent member in a radial direction centered on the axis and that rotates together with the flex gear with respect to the internal gear; and
    a transmitter that extends along the radial direction and that transmits motive power of the flex gear to the outputter, wherein
    the cam has N poles positioned at equal intervals in a circumferential direction centered on the axis, and causes the outer gear to engage with the inner gear at N locations, N being an integer of 2 or greater,
    the transmitter is fixed to one of the opposing portion and the adjacent member, and an insertion portion into which the transmitter is inserted is provided in another of the opposing portion and the adjacent member,
    the insertion portion has a width along the circumferential direction that is wider than the transmitter, and allows relative displacement in the circumferential direction of the flex gear and the outputter, and
    a plurality of transmission pairs is arranged in the circumferential direction, the transmission pairs being pairs of the transmitter and the insertion portion.

2. The strain wave gearing according to claim 1, wherein the plurality of transmission pairs is arranged at equal intervals in the circumferential direction.

3. The strain wave gearing according to claim 1, wherein 2×N or more of the transmission pairs is provided.

4. The strain wave gearing according to claim 1, wherein the plurality of transmission pairs includes
    a first pair in which the transmitter is positioned at one end in the circumferential direction of the insertion portion when the cam is rotating around the axis, and
    a second pair in which the transmitter is positioned at another end in the circumferential direction of the insertion portion when the cam is rotating around the axis.

5. The strain wave gearing according to claim 4, wherein N of the first pair and N of the second pair are provided.

6. The strain wave gearing according to claim 5, wherein the first pair and the second pair alternately exist every 360°/(2×N) at angles centered on the axis.

7. The strain wave gearing according to claim 1, wherein the insertion portion allows relative displacement in the radial direction of the flex gear and the outputter.

8. The strain wave gearing according to claim 1, further comprising:
    a supporter that rotatably supports the outputter with respect to the internal gear, wherein
    the adjacent member and the opposing portion are positioned between the supporter and the cam.

9. The strain wave gearing according to claim 1, wherein the transmitter includes a column-shaped pin, and
    the insertion portion includes an elongated hole having an opening diameter in the circumferential direction that is longer than an outer diameter of the pin.

10. The strain wave gearing according to claim 1, wherein the opposing portion is positioned on an inner circumferential side of the adjacent member.

11. The strain wave gearing according to claim 1, wherein the opposing portion is positioned on an outer peripheral side of the adjacent member.

12. The strain wave gearing according to claim 1, wherein the transmitter includes a column-shaped pin fixed to the opposing portion, and the insertion portion is provided in the adjacent member, includes an elongated hole having an opening diameter in the circumferential direction that is longer than an outer diameter of the pin, and allows relative displacement in the radial direction of the flex gear and the outputter.

13. The strain wave gearing according to claim 12, further comprising:
a supporter that rotatably supports the outputter with respect to the internal gear, wherein
the adjacent member and the opposing portion are positioned between the supporter and the cam.

14. The strain wave gearing according to claim 13, wherein
the plurality of transmission pairs includes
a first pair in which the transmitter is positioned at one end in the circumferential direction of the insertion portion when the cam is rotating around the axis, and
a second pair in which the transmitter is positioned at another end in the circumferential direction of the insertion portion when the cam is rotating around the axis.

15. The strain wave gearing according to claim 14, wherein N of the first pair and N of the second pair are provided.

16. The strain wave gearing according to claim 15, wherein the first pair and the second pair alternately exist every 360°/(2×N) at angles centered on the axis.

17. The strain wave gearing according to claim 14, wherein the opposing portion is positioned on an inner circumferential side of the adjacent member.

18. The strain wave gearing according to claim 16, wherein the opposing portion is positioned on an inner circumferential side of the adjacent member.

19. The strain wave gearing according to claim 14, wherein 2×N or more of the transmission pairs is provided, and the transmission pairs are arranged at equal intervals in the circumferential direction.

20. The strain wave gearing according to claim 16, wherein 2×N or more of the transmission pairs is provided, and the transmission pairs are arranged at equal intervals in the circumferential direction.

* * * * *